United States Patent [19]

Yoshiki et al.

[11] Patent Number: 4,823,066
[45] Date of Patent: Apr. 18, 1989

[54] THREE-PHASE INDUCTION MOTOR CONTROL METHOD

[75] Inventors: Yoshiki Fujika, Higashiyamato; Shinichi Kouno, Hino; Tatsuo Shinohara, Hachioji, all of Japan

[73] Assignee: Fanuc Ltd., Minamitsuru, Japan

[21] Appl. No.: 52,856

[22] PCT Filed: Aug. 14, 1986

[86] PCT No.: PCT/JP86/00420
§ 371 Date: Apr. 10, 1987
§ 102(e) Date: Apr. 10, 1987

[87] PCT Pub. No.: WO87/01250
PCT Pub. Date: Feb. 26, 1987

[30] Foreign Application Priority Data

Aug. 14, 1985 [JP] Japan .................. 60-179165

[51] Int. Cl.⁴ .............................................. H02P 5/40
[52] U.S. Cl. .................................. 318/798; 318/806; 318/811; 318/759
[58] Field of Search ............................. 318/800-803, 318/798, 805, 807-811, 759-762

[56] References Cited

U.S. PATENT DOCUMENTS

| | | | |
|---|---|---|---|
| 3,899,725 | 8/1975 | Plunkett | 318/802 |
| 4,023,083 | 10/1977 | Plunkett | 318/802 |
| 4,047,083 | 9/1977 | Plunkett | 318/807 |
| 4,490,666 | 12/1984 | Tanamachi et al. | 318/802 |
| 4,532,464 | 7/1985 | Igarashi et al. | 318/798 |
| 4,620,272 | 10/1986 | Fulton et al. | 318/762 |

Primary Examiner—David Smith, Jr.
Attorney, Agent, or Firm—Staas & Halsey

[57] ABSTRACT

An induction motor control method includes producing a primary current as a current command which takes all constants of an induction motor (d) into consideration. An output torque is obtained which is linear with respect to a torque command (Tm), a voltage at a DC link portion is detected, and an excitation flux command is varied by this DC voltage (V). This enables constant-output control to be performed irrespective of fluctuations in power supply voltage. Further, a power-factor adjusting circuit (q) is provided for adjusting the phase between voltage on the AC power supply side and current at the time of regenerative braking, so that reactive power is reduced.

4 Claims, 6 Drawing Sheets

THREE-PHASE INDUCTION MOTOR CONTROL METHOD

BACKGROUND OF THE INVENTION

1. Technical Field

This invention relates to a three-phase induction motor control method for performing motor drive control and regenerative control based on digital values.

2. Description of the Related Art

Recent control of three-phase induction motors is in many cases performed by a vector control method of controlling the instantaneous value of motor stator current and generating a torque equivalent to that of a shunt DC machine.

Using vector control of this type to perform motor drive control and regenerative control of a three-phase induction motor is disclosed in e.g. Japanese patent application Laid-Open No. 59-14385.

If an induction motor is subjected to vector control in cases where velocity control is performed up to a region of high rotational velocity, as in a spindle motor of a machine tool or the like, or in cases where control is performed to weaken excitation in accordance with a torque command at a constant rpm, the torque command, excitation current, secondary current and slip frequency become non-linear due to such effects as the secondary leakage impedance and core loss of the motor. As a result, the output torque also becomes non-linear with respect to the torque command, so that a linear relationship between the torque command and output torque cannot be accurately maintained.

Furthermore, since the output of an induction motor generally varies in proportion to the square of the voltage impressed upon the motor, the output will fluctuate when the AC input voltage undergoes a large variation. In the vector control method, a measure devised for preventing such a fluctuation in output entails varying the amount of maximum slip in dependence upon the AC input voltage. Nevertheless, satisfactory results are not obtained in terms of holding the output of the induction motor constant.

At time of regenerative braking, moreover, the power-factor fluctuates due to the capacity of a phase advancing capacitor on the input side, and there is an increase in power supply distortion and reactive power.

SUMMARY OF THE INVENTION

The present invention has been devised to solve the foregoing problems and its object is to provide a three-phase induction motor control method in motor drive control and regenerative control based on the vector control method using a power amplifier comprising a converter and an inverter, in which a linear output torque can be obtained with respect to a torque command without using a flux sensor, and in which the output of the three-phase induction motor can be held constant even when there are fluctuations in power supply voltage.

According to the present invention, there is provided a three-phase induction motor control method based on vector control for converting an AC input into a direct current at the time of motor drive control to drive a three-phase induction motor at a variable velocity. The three-phase induction motor is driven by the output of a first inverter to which the converted direct current is applied. In control method an output current of the three-phase induction motor is converted into a direct current at the time of regenerative control to regenerate the output of a second inverter, to which the direct current resulting from the conversion is applied, in an AC power supply. The method includes vector analyzing an excitation current command and secondary current command into an excitation flux direction component and a motor electromotive force direction component, respectively, on the basis of a torque command with respect to the three-phase induction motor and an excitation flux command decided to accommodate the three-phase induction motor. The method also includes determining a primary current command of the motor based on a synthesis of the vector components, and detecting the voltage of a direct current link portion of a circuit for converting the AC input into a direct current. The method further includes correcting the excitation flux command in dependence upon the detected voltage, obtaining a linear torque command and performing constant output control irrespective of a fluctuation in the power supply voltage, and adjusting a phase between voltage and current on the side of the AC power supply at the time of regenerative control, thereby performing control in such a manner that reactive power is reduced.

DESCRIPTION OF THE PREFERRED EMBODIMENT

Figure 1:
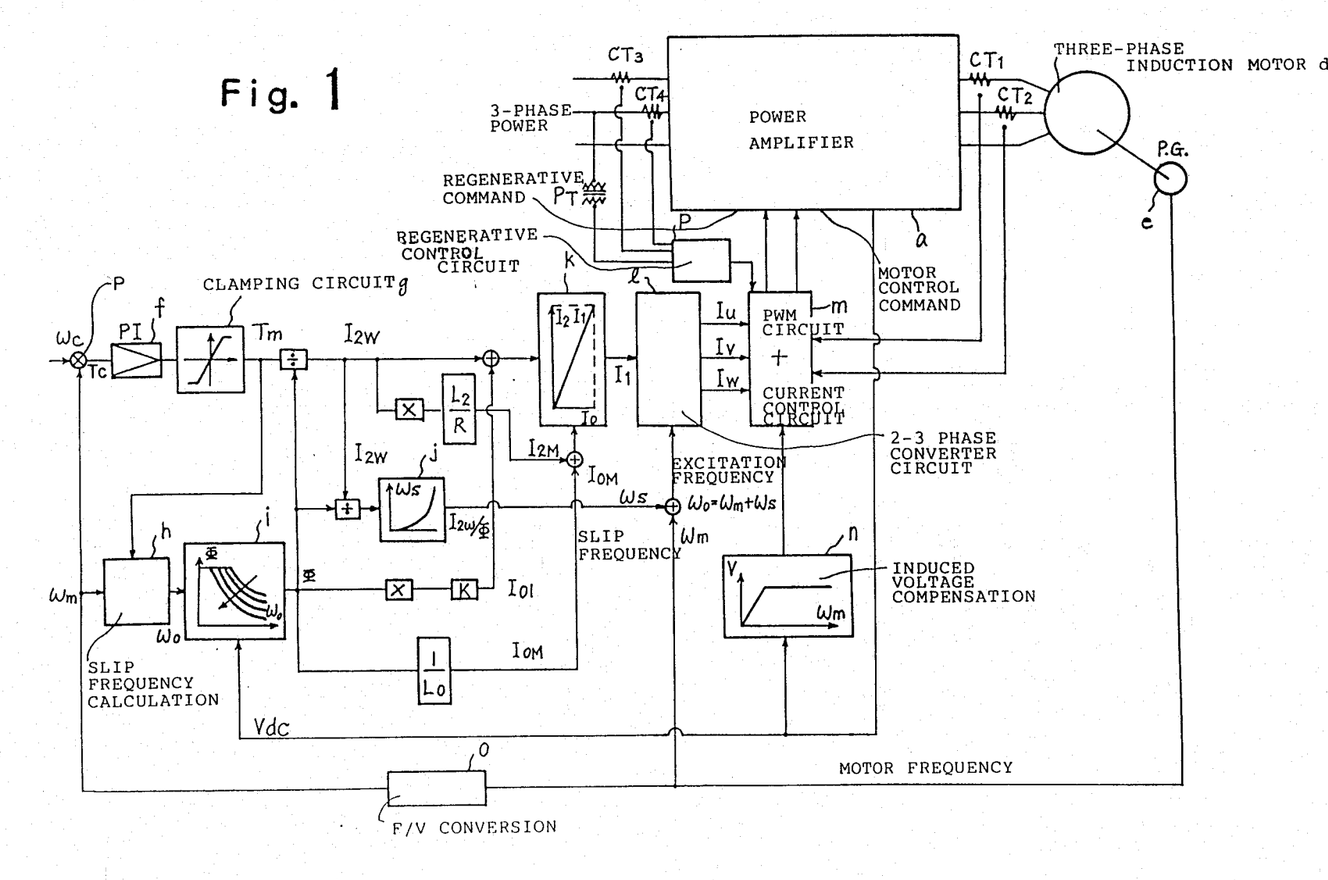
FIG. 1 is a block diagram of an embodiment of a system for practicing the method of the present invention.
Figure 2:
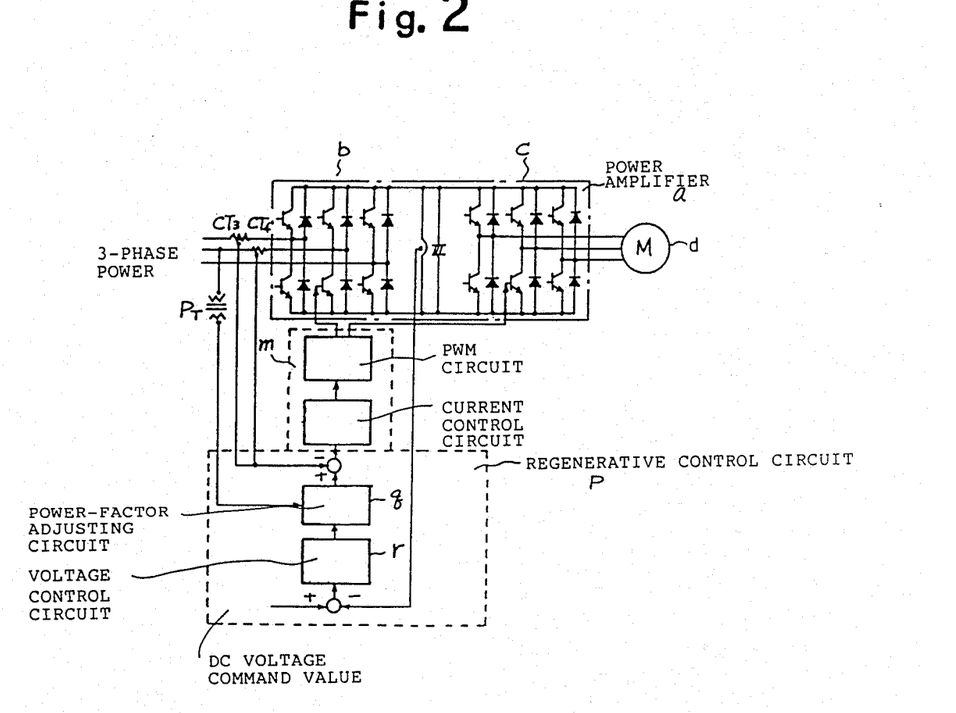
FIG. 2 is a circuit diagram of a portion of FIG. 1.

The method of the invention will be described in conjunction with the drawings. FIG. 1 is a block diagram of a control circuit for practicing the method of the invention, and FIG. 2 is a circuit diagram of a power amplifier section shown in FIG. 1.

Before describing the control circuit of FIG. 1, let us refer to FIGS. 3 through 7 to describe the technique on which the present invention is premised.

Figure 3:
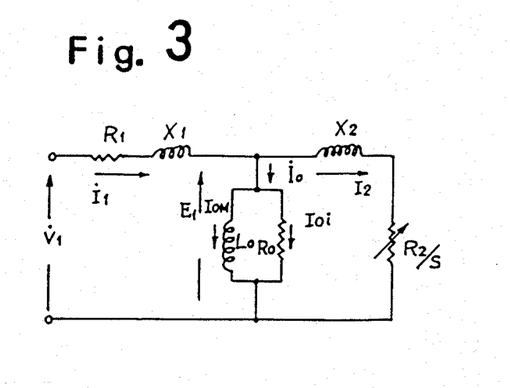
FIG. 3 is an equivalent circuit of one phase of a three-phase induction motor.
Figure 4:
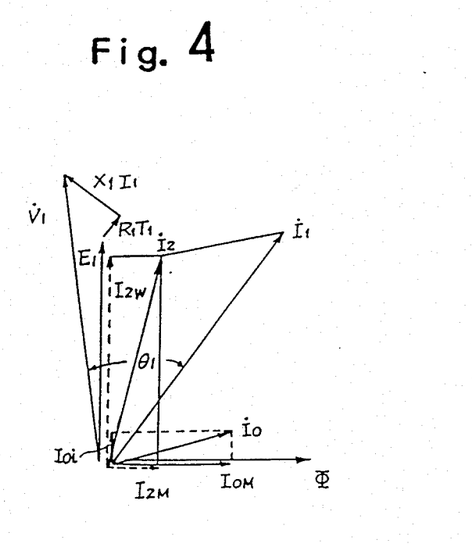
FIG. 4 is a vector diagram.
Figure 5:
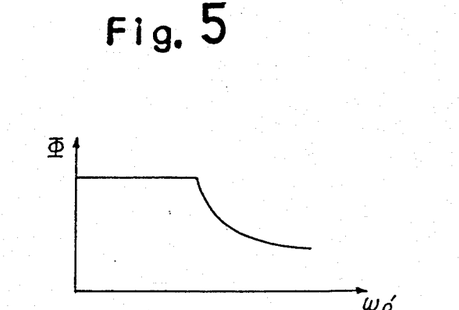
FIGS. 5–10 are graphs for describing the characteristics of a three-phase induction motor.
Figure 6:
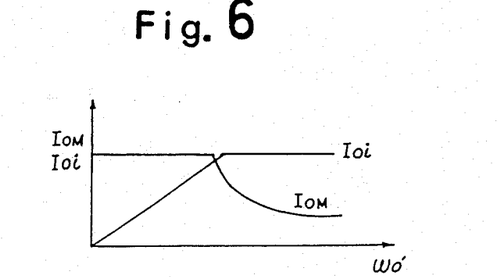
Figure 7:
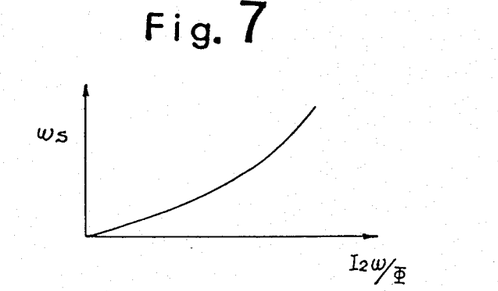

FIG. 3 is an equivalent circuit of one phase of a three-phase induction motor, FIG. 4 is a vector diagram, and FIGS. 5, 6 and 7 are graphs for explaining characteristics. Vector control of a three-phase induction motor is performed as follows:

(1) A velocity command $\omega_c$ is set.

(2) Motor velocity $\omega_m$ is sensed.

(3) A torque command $T_c$ is obtained by performing a subtraction between $\omega_c$ and $\omega_m$.

(4) An estimated value $\omega'_s$ of slip is obtained as follows:

$$\omega'_s = K_0 \times T_c \times \omega_m \quad (K_0 \text{ is a constant})$$

(5) An estimated value $\omega'_0$ of excitation frequency is obtained as follows:

$$\omega'_0 = \omega_m + \omega'_s$$

(6) A flux $\Phi$ corresponding to the excitation frequency $\omega'_0$ is obtained from the characteristic diagram of FIG. 5.

(7) A winding resistance measurement, a no-load test and a lock test are carried out, and values of primary induction voltage $E_1$ and core loss current $I_{0i}$ of the excitation current $I_0$ are found from the equivalent circuit of FIG. 3, and values of magnetization current $I_{0M}$, excitation resistance $R_0$ and excitation reactance $L_0$ are found from the vector diagram of FIG. 4.

(8) A revolving coordinate system is transformed into a fixed coordinate system, with the flux $\Phi$ of the revolving field serving as a reference phase. This is done as follows:

① Excitation current $\dot{I}_0$ is obtained as follows by taking the vector sum between a component $\dot{I}_{0M}$ along the $\Phi$ axis and a component $\dot{I}_{0i}$ along the $E_1$ axis:

$$\dot{i}_0 = \dot{i}_{0M} + \dot{i}_{0i}$$

② Similarly, secondary current $\dot{I}_2$ is obtained as follows by taking the vector sum between a component $\dot{I}_{2M}$ along the $\Phi$ axis and a component $\dot{I}_{2\omega}$ along the $E_1$ axis:

$$\dot{i}_2 = \dot{i}_{2M} + \dot{I}_{2w}$$

③ The flux $\Phi$ is obtained as $$\Phi = L_0 \cdot I_{0M}$$

from $$E_1 = d\Phi/dt$$
$$= L_0 \times (d\dot{i}_{0M}/dt)$$
$$= d(L_0 \dot{I}_{0M})/dt$$

Next, $$\Phi_{0M} = \Phi/L_0$$

$$I_{0i} = K\omega'_0 \Phi \quad (K \text{ is a constant})$$

are obtained from the characteristic diagram of FIG. 6.

(9) The $E_1$-axis component $I_{2w}$ of secondary current $I_2$ is obtained from $$I_{2w} = (T_c/\Phi)$$

(10) The slip frequency $\omega_s$ is determined from the characteristic diagram of FIG. 7.

(11) The $\Phi$-axis component $I_{2M}$ of the secondary current $I_2$ is obtained from $$I_{2M} = I_{2w} \times \omega_s \times (L_2/R_2)$$

(12) The component of primary current $I_1$ in the $\Phi$ direction is obtained from $$I_1(\Phi) = I_{0M} + I_2$$

(13) The component of primary current $I_1$ in the $E_1$ direction is obtained from $$I_1(E_1) = I_{0i} + I_{2w}$$

The primary current so obtained is a current command for a case where all constants of the induction motor are taken into consideration, and is for the purpose of obtaining a linear output torque with respect to a torque command.

(14) The excitation frequency $\omega_0$ is obtained from $$\omega_0 = \omega_m + \omega_s$$

Let us return to the block diagram of FIG. 1 to describe the same. As shown in FIG. 2, a power amplifier a, which comprises a converter b and an inverter c respectively provided on AC input and DC output sides, is connected to an AC power supply. The converter b is constituted by a full-wave rectifier bridge composed of diodes, each of which is connected in parallel with a transistor inverter. A DC voltage is obtained by the converter b of the power amplifier a and is applied to the inverter c. The output voltage of the inverter c is pulse-width controlled by a PWM/current control circuit m before being impressed upon a three-phase induction motor d.

The velocity command $\omega_c$ and the motor velocity $\omega_m$, which is obtained, via a F/V converter o, from a voltage signal detected by a tachogenerator e, are inputted to a comparator p to obtain the torque command $T_c$ as a difference signal voltage. The torque command $T_c$ is corrected via a PI and a clamping circuit g to form an actual torque command $T_m$. Thereafter, the primary current $I_1$ and excitation frequency $\omega_0$ are obtained as described above in (4)–(14). These are applied to a 2-to-3 phase converter circuit 1. The 2-to-3 phase converter circuit 1 converts orthogonal two-phase currents into three-phase currents to form current commands Iu, Iv, Iw in the respective three phases, these commands being applied to the PWM/current control circuit m. The input currents to the motor are fed back to the circuit m by CT1, CT2 to be compared with the output currents of the 2-to-3 phase converter circuit, whereby the circuit delivers a commanded current I in each phase to the inverter c.

Figures 8, 9:
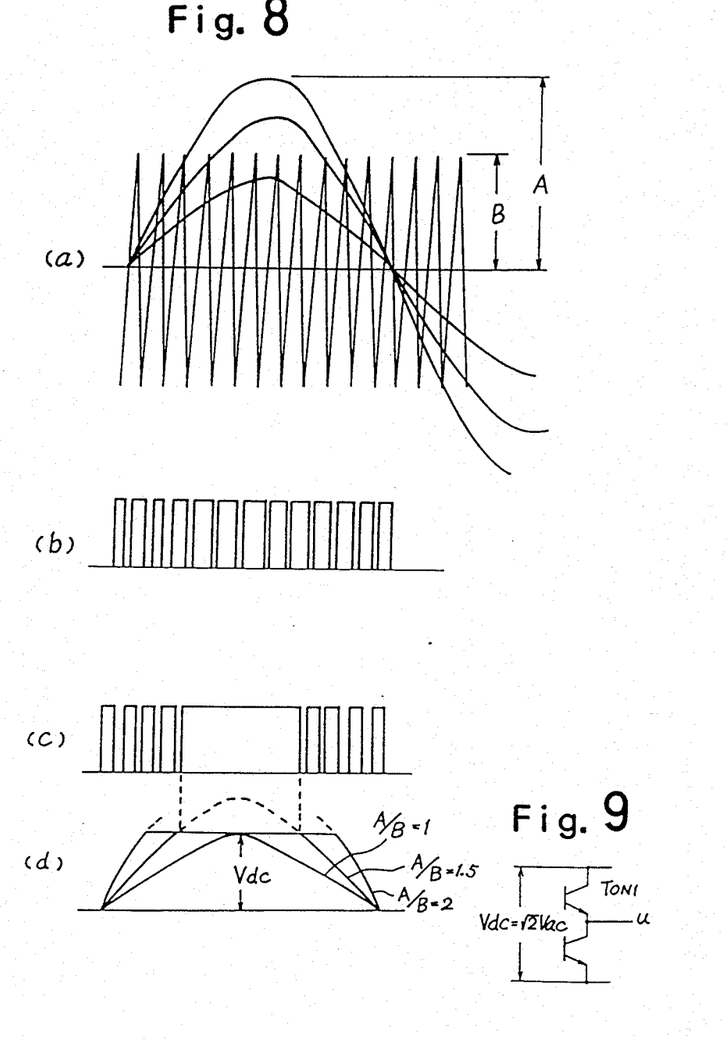

The operation of the invention will now be described in terms of detecting voltage Vdc on the DC side of the power amplifier and correcting the flux $\Phi$ and induced voltage V. If a triangular wave is formed within the PWM circuit, then the output voltage will differ depending upon the degree to which the triangular wave is utilized, considering the relationship between a voltage command amplitude and the actual terminal voltage of the motor. Let B represent the amplitude of the triangular wave, and let A represent the amplitude of the PWM signal, as shown in FIG. 8(a). If the amplitude ratio A/B is less than 1, then the output voltage $V_u$ from a point u in FIG. 9 is as follows:

$$V_u = (T_{ON1}/T) \times \sqrt{2V_{ac}}\{(1+\sin\theta)/2\}$$

where T represents the period. The line voltage across $u-v$ applied to the motor is $$\begin{aligned}
V_{u-v} &= (T_{ON1}) \times \sqrt{2V_{ac}} \times \{\sqrt{3}\cos(\theta - 60°)/2\} \\
&= (A/B) \times \sqrt{2V_{ac}} \times \{(\sqrt{3/2})/\sqrt{2}\} \\
&= (T_{ON1}/T) \times V_{dc} \times (\sqrt{3/2}) \times (1/\sqrt{2})
\end{aligned}$$

where
Vac: effective value
Vdc: set value (DC voltage)

Figure 10:
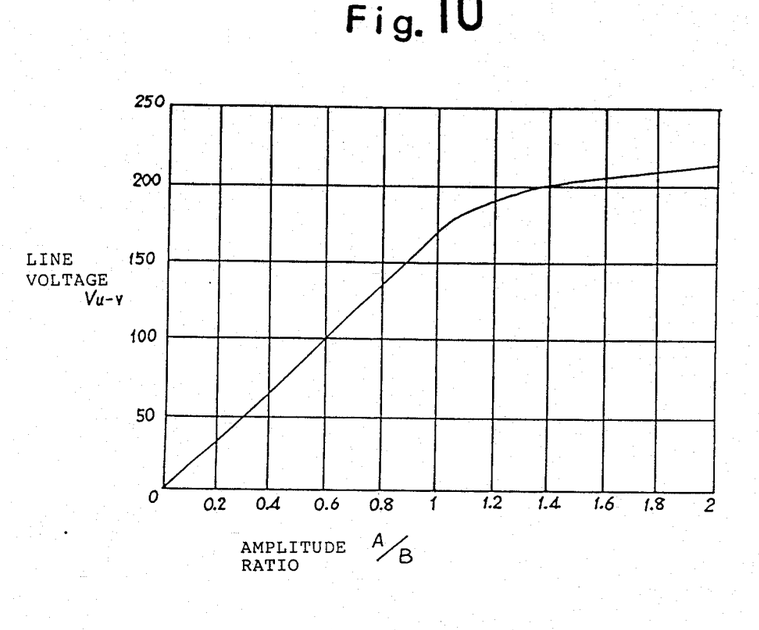

Next, let us consider control by a base signal of the transistor constituting the inverter for a case where the amplitude ratio A/B is greater than 1. Though a method exists in which the base signal of Tr in the inverter is turned off whenever the amplitude ratio (A/B) exceeds 1, as shown in FIG. 8(b), this method involves certain problems, namely the fact that the output voltage will not rise, switching loss is great, etc. FIG. 10 illustrates the manner in which the line voltage $V_{u-v}$ varies with respect to the amplitude ratio A/B.

In the present invention, all of the transistors Tr turn on, as shown in FIGS. 8(c), (d), in a range where the amplitude A of the PWM signal exceeds the amplitude B of the triangular wave. In other words, when the DC voltage is low, the flux command Φ above a base velocity is increased, the amplitude of the PWM circuit with respect to the triangular wave is raised, and the terminal voltage of the motor is raised to obtain a constant output. When the DC current is high, the flux command is decreased from a region below the base velocity, the amplitude of the PWM command signal with respect to the triangular wave is reduced, and the terminal voltage of the motor is lowered to obtain a constant output. As shown in the block diagram of FIG. 1, such control is performed by inputting the DC voltage $V_{dc}$ sensed by the inverter to a data map i indicating the relationship between excitation frequency and flux, and correcting the flux Φ in dependence upon the DC voltage $V_{dc}$.

It should be noted that an induced voltage compensating circuit n corrects the value of induced voltage with respect to the motor velocity signal $\omega_m$ and applies the corrected value to the PWM/current control circuit m.

The regenerative control operation of the present invention will now be described with reference to FIG. 2. A regenerative control circuit P is provided with a voltage control circuit r and a power-factor adjusting circuit q.

When regenerative control is performed, voltage on the DC side of the power amplifier a and the DC voltage command value are compared. When the voltage of the DC side is larger, an offset signal is inputted to the power-factor adjusting circuit q through the voltage control circuit r. The input voltage on the AC side of the power amplifier a is applied to the power-factor adjusting circuit via the PT, and the regenerative current command signal is outputted to the current control circuit in such a manner that the currents on the AC input side of the power amplifier sensed by CT3, CT4 take on the same phase as the voltage on the AC side, i.e. in such a manner that the power-factor becomes 1. The PWM circuit controls the transistor inverter on the basis of this commanded value.

Industrial Applicability

Thus, in motor drive control and regenerative control based on the vector control method using a power amplifier comprising a converter and an inverter, the three-phase induction motor control method of the present invention enables a linear output torque to be obtained with respect to a torque command without using a flux sensor, and enables the output of the three-phase induction motor to be held constant even when there are fluctuations in power supply voltage.

What is claimed is:

1. A three-phase induction motor control method based on vector control for converting an AC input into a direct current at the time of motor drive control, to drive a three-phase induction motor at a variable velocity by the output of a first inverter to which the direct current resulting from the conversion is applied, and for converting an output current of the three-phase induction motor into a direct current at the time of regenerative control to regenerate the output of a second inverter, to which the direct current resulting from the conversion is applied, in an AC power supply, the method comprising:
    (a) vector analyzing an excitation current command and a secondary current command into an excitation flux direction component and a motor electromotive force direction component, respectively, on the basis of a torque command with respect to the three-phase induction motor and an excitation flux command decided to accommodate the three-phase induction motor;
    (b) determining a primary current command of the motor based on a synthesis of the vector components determined in said step (a);
    (c) detecting the voltage of a direct current link portion of a circuit for converting the AC input into a direct current;
    (d) correcting the excitation flux command in dependence upon the detected voltage; and
    (e) obtaining a linear torque command and performing constant output control irrespective of a fluctuation in the power supply voltage.

2. A three-phase induction motor control method according to claim 1, further comprising the step of adjusting a phase between voltage and current on the side of the AC power supply at the time of regenerative control of the three-phase induction motor, thereby performing control in such a manner that reactive power is reduced.

3. A three-phase induction motor control method according to claim 1, wherein said step (d) comprises turning on switching elements forming the inverter at all times in a range where the amplitude of a PWM signal for the first inverter exceeds the amplitude of a triangular waveform.

4. A three-phase induction motor control method based on vector control for converting an AC input into a direct current for motor drive control, comprising the steps of:
    (a) vector analyzing an excitation current command and a secondary current command to obtain an excitation flux direction component and a motor electromotive force direction component, respectively, on the basis of a torque command with respect to the three-phase induction motor and an excitation flux command determined to accommodate the three-phase induction motor;
    (b) determining a primary current command of the three-phase induction motor based on a synthesis of the vector components determined in said step (a);
    (c) detecting the voltage of a direct current link portion of a circuit for converting the AC input into a direct current;
    (d) correcting the excitation flux command in dependence upon the detected voltage; and
    (e) obtaining a linear torque command and performing constant output control irrespective of a fluctuation in the power supply voltage.

* * * * *

UNITED STATES PATENT AND TRADEMARK OFFICE
CERTIFICATE OF CORRECTION

PATENT NO. : 4,823,066
DATED : APRIL 18, 1989
INVENTOR(S) : YOSHIKI FUJIKA ET AL.

It is certified that error appears in the above-identified patent and that said Letters Patent is hereby corrected as shown below:

Col. 1, line 67, after "In" insert --the--.

Col. 2, line 10, "decided" should be --determined--.

Col. 3, line 17, "$I_{oi}$" should be --$\dot{I}_{oi}$--;

line 25, "$I_{2w}$" should be --$\dot{I}_{2w}$--.

Col. 5, line 55, delete "Industrial Applicability--;
line 56, change "Thus, in" to --In--.

Signed and Sealed this

Third Day of October, 1989

Attest:

DONALD J. QUIGG

Attesting Officer

Commissioner of Patents and Trademarks